No. 879,148.

PATENTED FEB. 18, 1908.

R. A. CUMMINGS.

CONNECTING AND SPACING CLIP FOR METAL REINFORCEMENT, &c.

APPLICATION FILED MAR. 8, 1907.

WITNESSES.
J. R. Keller
Robert C. Totten

INVENTOR.
Robert A. Cummings
By Kay Totten & Winter
Attorneys

UNITED STATES PATENT OFFICE.

ROBERT A. CUMMINGS, OF BEAVER, PENNSYLVANIA.

CONNECTING AND SPACING CLIP FOR METAL REINFORCEMENT, &c.

No. 879,148.　　　　Specification of Letters Patent.　　　Patented Feb. 18, 1908.

Application filed March 8, 1907. Serial No. 361,308.

*To all whom it may concern:*

Be it known that I, ROBERT A. CUMMINGS, a resident of Beaver, in the county of Beaver and State of Pennsylvania, have invented a new and useful Improvement in Connecting and Spacing Clips for Metal Reinforcement and the Like; and I do hereby declare the following to be a full, clear, and exact description thereof.

This invention relates to a connecting and spacing member or clip for the metal reinforcement for concrete, cement, beton and similar structures or for heavy metal fences or the like.

The object of the invention is to provide a device for the purpose stated, which is simple and cheap to manufacture, which can be applied in the field with a minimum amount of labor, which holds the parts firmly in contact and in proper position, and which is so constructed that the position of the connected members can be readily changed.

Many concrete and cement constructions are reinforced by means of metal rods, bars, strips or the like, extending both longitudinally and transversely or vertically, thus crossing each other. My device is adapted especially for connecting and holding such crossing reinforcing members. The device is so constructed that it holds these members rigidly and firmly in position, but in a manner to permit their adjustment if necessary, and at the same time serves to space the crossing members from the centering or casing so as to position the reinforcement properly in the concrete, as well as to insure its entire envelopment by the concrete.

The invention consists of a device of the character hereinafter described and claimed.

Figure 1:
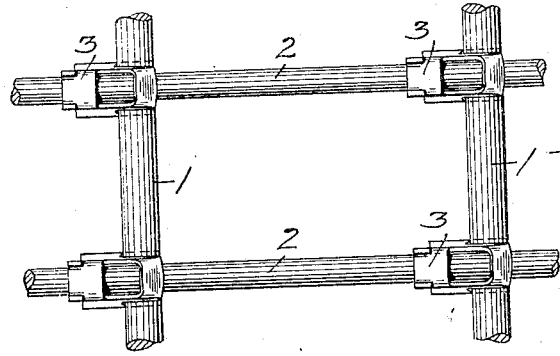
Figure 2:
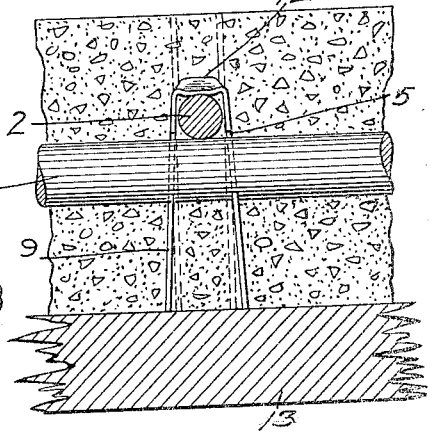
Figure 4:
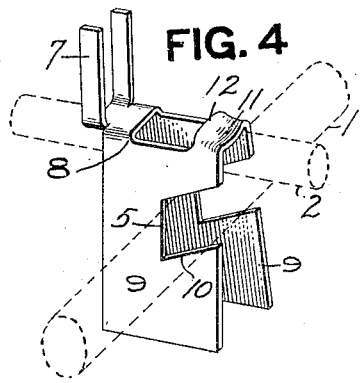
Figure 3:
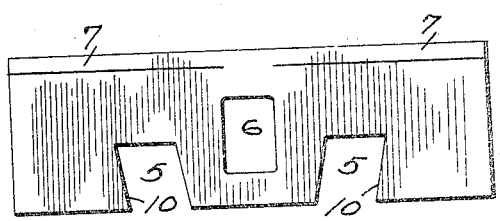

In the accompanying drawing Figure 1 is a view showing a portion of metal reinforcement consisting of crossing rods with my connecting and spacing member applied thereto; Fig. 2 is a section thereof, showing the cement or concrete body and also the centering or casing; Fig. 3 is a plan view of the blank from which the connecting and spacing member is formed, showing same after the punching operation; Fig. 4 is a perspective view of this member after it is bent to shape; and Figs. 5, 6, 7, 8 and 9 are perspective views showing modified forms of connecting and spacing members.

In Figs. 1 and 2, my invention is shown applied to crossing metal rods of a floor, ceiling, wall, partition or like construction, the crossing rods being designated by 1 and 2 respectively. These rods at their crossing points are connected by my improved connecting member or clip 3. This in its preferred form is formed from a thin plate of resilient metal, such as heavy sheet metal, which first is stamped out as shown in Fig. 3, with the two edge notches 5 and the central slit, opening or hole 6. Also, when desired, one or more tongues or fingers 7 will be stamped out at the same time, but said member can be used without such tongues or fingers. This stamped plate is then bent into substantially U form, as shown in Figs. 2 and 4, having the loop portion 8 with two substantially parallel limbs 9 with the notches 5 in alinement. When the tongues 7 are used, one or both thereof will also be bent at an angle as shown in Fig. 4. This clip is connected to the crossing rods by putting the loop portion over one of said rods, such as over the rod 2, with the two legs projecting at the sides of the rod 1, when by moving said clip longitudinally of the rod 2 the notches 5 are made to engage and embrace the rod 1. These notches as shown preferably have the wall opposite the loop slightly inclined as shown at 10, so that the rod 1 will be retained thereon. The crossing rods are then drawn tightly together by twisting or bending the portion 11 of the loop, left at one side of the opening or slit 6, this metal portion being a comparatively narrow strip or band which can be readily twisted with ordinary pliers so as to turn the same somewhat on edge, as shown at 12, Fig. 4, thus causing the down-turned edge to press the rod 2 downwardly and in that manner firmly bind the two crossing rods together.

Preferably the clip is made of resilient metal and the legs in normal position flare outwardly slightly, as shown in Fig. 2. By pressing these legs together, the bite on the rod 1 can be relieved and said rod moved in one direction or another, thus permitting the ready adjustment of the crossing rods. The clip can, of course, be made of a form to unite crossing members of any desired shape, either round rods as shown, flat bands, or in fact, any other desired cross section. When desired or necessary, the limbs 9, or one thereof, will be made long enough to serve as spacing members, resting upon the centering 13, as shown in Fig. 2. Or in lieu thereof, a finger 7 can act as a spacing member, or if the reinforcement must be spaced from both sides, such as that of partition constructions, both a finger 7 and limb 9 act as spacing members, the finger projecting oppositely to the limb.

Figure 5:
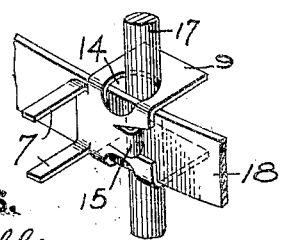

Fig. 5 shows a modification wherein the clip in place of notches 5 is provided with holes 14 through which one of the crossing members is threaded. Also in place of punching a slit or opening 6 to get the severed strip 11, this modification shows a portion 15 severed from the rest of the body by slitting and afterwards bent inwardly to bear against one of the crossing members and serving to force such members firmly together.

Figure 6:
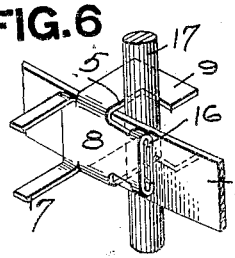

Fig. 6 shows another modification in which the loop portion is provided with small projecting portions 16 which are bent down against one of the crossing members to serve the same purpose as the twisted member 11 of the preferred modification as described. Figs. 5 and 6 show one of the crossing members as a flat strip or band, such as used in column constructions. All of the forms can be used for connecting any crossing members, either for floor, ceiling, wall, partition or column constructions.

Figure 7:
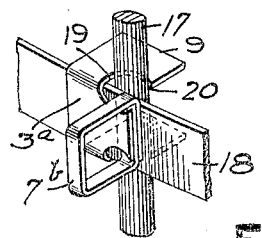
Figure 8:
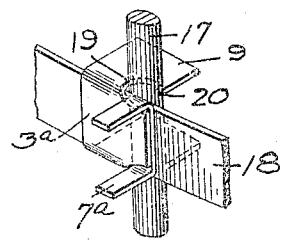
Figure 9:
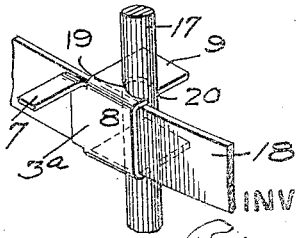

Figs. 7, 8 and 9, like Figs. 5 and 6, show a construction such as can be used in columns, tanks and the like, having the vertical or compression rods 17 and the transverse bands 18 connected together by clips 3ª, which may be such as heretofore described. In these views, the clips are slightly modified, having the edge notches 19 with tongues 20 at the open sides to prevent the disengagement of the clip and vertical rods. These clips may, if desired, have the outwardly projecting fingers or tongues 7, as shown in Fig. 9 and the other views, or may have a separate piece either in a U form 7ª, Fig. 8, or in a loop, 7ᵇ, as shown in Fig. 7, and which serves as a spacing member to contact with the casing. This separate piece is shown as held between the body of the clip and the band, so that it cannot get out of place while being erected or while the concrete is being filled around the reinforcement.

The devices described are very simple of construction, can be made from ordinary sheet or band metal by ordinary punching and bending operations, and can be easily applied in the field. These devices firmly grasp the crossing members and bind them tightly together, but nevertheless in a manner which permits the relative positions of the crossing members to be readily changed. The connecting members also serve as spacing members.

What I claim is:

1. A connector for crossing metal members, comprising a clip provided with a loop to embrace one of said crossing members and having a limb arranged to engage and retain the other crossing member, the loop portion of the clip having a severed portion arranged to be bent after the clip is applied to the crossing members and thereby forced against one of said members to bind them together.

2. A connector for crossing metal members, comprising a clip provided with a loop to embrace one of said crossing members and having limbs provided with openings at a right angle to the loop to receive and retain the other crossing member, the loop portion of said clip having a severed portion arranged to be bent after the clip is applied to the crossing members and thereby forced against one of said members to bind them together.

3. A connector for crossing metal members, comprising a clip provided with a loop to embrace one of said crossing members and having two limbs provided with alining openings to receive and retain the other crossing member, the loop portion of said clip being provided with a band severed from the body of the loop and arranged to be twisted and thereby forced against one of the crossing members to bind them together.

4. A connector for crossing metal members, comprising a clip provided with a loop to embrace one of the crossing members and having two limbs provided with edge notches for receiving and retaining the other crossing member, a portion of the loop being arranged to be bent and thereby forced against one of the crossing members to bind them together.

5. A connector for crossing metal members, comprising a substantially U shaped clip formed of resilient metal to provide a loop to embrace one of the crossing members and having limbs provided with edge notches at right angles to the central loop for receiving and retaining the other crossing member, said loop having a portion arranged to be bent and thereby forced against one of the crossing members.

6. A connector for crossing metal members, comprising a clip provided with a loop to engage one of the crossing members and having limbs provided with openings at right angles to the loop to receive the other crossing member, the loop portion of said clip being provided with a severed portion arranged to be bent after the clip is applied to the crossing members and forced against one of the crossing members, and also having a finger projecting outwardly to contact with the casing.

7. A connector for crossing metal members, comprising a clip provided with a loop to engage one of the crossing members and having limbs provided with alining openings to receive the other crossing member, one or both of said limbs being extended to contact with the centering or casing, and a portion of the loop being arranged to be bent and forced against one of the crossing members.

8. A connector for reinforcement for concrete work, comprising a flat metal plate bent to U shape to provide a loop to embrace one reinforcement member and having its limbs provided in their side edges with openings or notches for receiving and retaining another reinforcement member at right angles to the first member, and having an outwardly extending projection for contacting with the centering or casing.

9. A connecting member for reinforcement for concrete work, comprising a clip provided with a loop to embrace a reinforcement member and having a limb or limbs provided in their side edges with openings or notches to receive and retain another reinforcement member at right angles to the first member, and having an outwardly projecting finger or fingers arranged to contact with the casing.

10. A connector for reinforcement for concrete work, comprising a U shaped clip having alining openings or notches in its limbs opening on the side edges thereof and having a tongue cut therefrom and extending outwardly therefrom.

11. A connector for reinforcement for concrete work, comprising a U shaped clip having alining openings or notches in its limbs opening in the side edges thereof and having an outwardly projecting portion united to the loop portion of the clip and arranged to contact with the centering or casing.

In testimony whereof, I the said ROBERT A. CUMMINGS have hereunto set my hand.

ROBERT A. CUMMINGS.

Witnesses:
ROBERT C. TOTTEN,
F. W. WINTER.